(12) United States Patent
Hall

(10) Patent No.: US 9,694,863 B2
(45) Date of Patent: Jul. 4, 2017

(54) TRACTION CHAIN FOR A CATERPILLAR CHAIN OF A TRACKED VEHICLE, AND KIT FOR A CATERPILLAR CHAIN

(71) Applicant: Hans Hall GmbH, Weingarten (DE)

(72) Inventor: Hans Hall, Weingarten (DE)

(73) Assignee: Hans Hall GmbH, Weingarten (DE)

( * ) Notice: Subject to any disclaimer, the term of this patent is extended or adjusted under 35 U.S.C. 154(b) by 44 days.

(21) Appl. No.: 14/606,203

(22) Filed: Jan. 27, 2015

(65) Prior Publication Data

US 2015/0210328 A1  Jul. 30, 2015

(30) Foreign Application Priority Data

Jan. 29, 2014  (DE) ........................ 10 2014 001 006

(51) Int. Cl.
| | | |
|---|---|---|
| *B65D 57/00* | (2006.01) | |
| *B62D 55/18* | (2006.01) | |
| *B62D 55/20* | (2006.01) | |

(52) U.S. Cl.
CPC ........... *B62D 55/18* (2013.01); *B62D 55/202* (2013.01)

(58) Field of Classification Search
CPC .... B62D 55/18; B62D 55/202; B62D 55/253; B62D 55/242; B62D 55/26; B62D 55/28; B62D 55/283; B62D 55/286; B62D 55/24; B62D 55/244; B62D 55/08; B62D 55/12
USPC ....... 305/158, 160, 161, 167, 178, 179, 180, 305/181, 182, 183, 187, 189, 191, 165, 305/169, 171, 173, 195
See application file for complete search history.

(56) References Cited

U.S. PATENT DOCUMENTS

| | | | |
|---|---|---|---|
| 3,582,155 A | 6/1971 | Marier et al. | |
| 3,767,275 A | 10/1973 | Russ, Sr. | |
| 3,858,948 A * | 1/1975 | Johnson ............... | B62D 55/244 305/167 |

(Continued)

FOREIGN PATENT DOCUMENTS

| | | |
|---|---|---|
| CA | 2014852 A1 | 10/1990 |
| DE | 1 918 847 A1 | 11/1969 |

(Continued)

OTHER PUBLICATIONS

Extended European Search Report (Application No. 15152588.8) dated Feb. 24, 2016.

(Continued)

*Primary Examiner* — James M Dolak
(74) *Attorney, Agent, or Firm* — Burr & Brown, PLLC

(57) ABSTRACT

A traction chain for a caterpillar chain of a tracked vehicle. The traction chain is equipped with an engagement member for a driving wheel, with track guide elements, which are provided to guide a running gear of the tracked vehicle in a track, on an inner side of the traction chain, running in a running direction of the traction chain, and with a multiplicity of attachment members, each of which is provided to attach a caterpillar cleat to an outer side of the traction chain and transversely in relation to the running direction of the traction chain. The traction chain is provided for use with a lateral chain running parallel therewith, the traction chain furthermore is formed partially from an elastic base material, into which at least one traction member is embedded, extending in a running direction of the traction chain.

25 Claims, 6 Drawing Sheets

(56) References Cited

U.S. PATENT DOCUMENTS

| | | | | |
|---|---|---|---|---|
| 4,332,424 A * | 6/1982 | Thompson | B62D 55/24 | 305/180 |
| 4,844,562 A * | 7/1989 | Ranner | B62D 55/253 | 305/167 |
| 5,199,771 A * | 4/1993 | James | B62D 55/26 | 198/699 |
| 5,201,574 A * | 4/1993 | James | B62D 55/26 | 305/180 |
| 5,265,949 A * | 11/1993 | Haug | B62D 55/27 | 305/180 |
| 5,354,124 A | 10/1994 | James | | |
| 5,533,796 A * | 7/1996 | Beeley | B62D 55/244 | 305/166 |
| 6,296,330 B1 * | 10/2001 | Hall | B62D 55/27 | 305/161 |
| 6,540,310 B1 * | 4/2003 | Cartwright | B62D 55/28 | 305/160 |
| 8,353,372 B2 * | 1/2013 | Dorais | B62D 55/12 | 180/208 |
| 8,388,072 B2 * | 3/2013 | Rainer | B62D 55/286 | 305/180 |
| 8,757,736 B2 * | 6/2014 | Kirchmair | B62D 55/21 | 305/46 |
| 8,936,324 B2 * | 1/2015 | Paquet | B62D 55/202 | 305/174 |
| 9,457,851 B2 * | 10/2016 | Delisle | B62D 55/24 | |
| 9,469,357 B2 * | 10/2016 | Sun | B62D 55/108 | |
| 9,511,805 B2 * | 12/2016 | Lajoie | B62D 55/244 | |
| 9,533,722 B2 * | 1/2017 | Haut | B62D 55/202 | |
| 9,545,964 B2 * | 1/2017 | Shimozono | B62D 55/12 | |
| 2013/0147262 A1 | 6/2013 | Paquet | | |

FOREIGN PATENT DOCUMENTS

| | | |
|---|---|---|
| DE | 37 31 618 A1 | 4/1988 |
| DE | 698 00 444 T2 | 4/2001 |
| EP | 0 858 945 A1 | 8/1998 |
| JP | 02-274682 A1 | 11/1990 |
| WO | 2009/144291 A1 | 12/2009 |

OTHER PUBLICATIONS

German Search Report (Application No. 10 2014 001 006.6) dated Oct. 14, 2014.

* cited by examiner

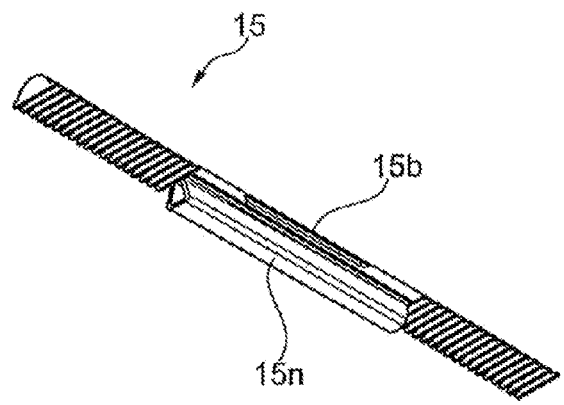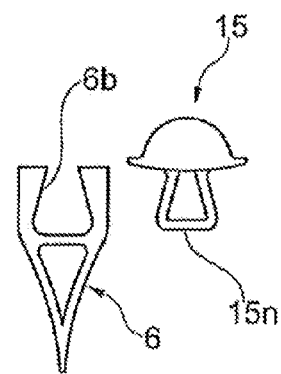
Fig. 13a  Fig. 13b
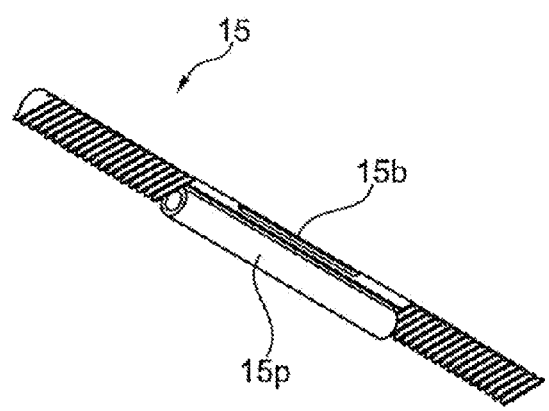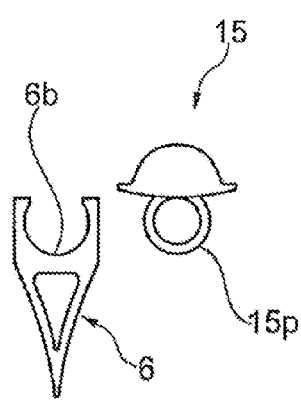
Fig. 14a  Fig. 14b

US 9,694,863 B2

TRACTION CHAIN FOR A CATERPILLAR CHAIN OF A TRACKED VEHICLE, AND KIT FOR A CATERPILLAR CHAIN

This application claims the benefit under 35 USC §119 (a)-(d) of German Application No. 10 2014 001 006.6 filed Jan. 29, 2014, the entirety of which is incorporated herein by reference.

FIELD OF THE INVENTION

The invention relates to a traction chain for a caterpillar chain of a tracked vehicle, and to a kit for a caterpillar chain.

BACKGROUND OF THE INVENTION

One of the requirements imposed upon tracked vehicles intended for applications in sensitive, and possibly protected, natural environments is that loading of the ground by a running gear, and by a caterpillar chain moved thereby, be limited or limitable. This category of tracked vehicles includes, in particular, snow vehicles such as, for example, piste vehicles and, for example, loipe grooming vehicles. A design that meets such a requirement to spare the terrain also renders such tracked vehicles suitable for use in a terrain that has yielding ground, for example in biotopes such as moorland. If the ground has scarcely any covering of snow and ice, or none at all, a tracked vehicle such as, for example, a piste groomer can be equipped with a known summer chain that is adapted, in particular, to ground that is free of snow and ice.

Caterpillar chains for such tracked vehicles are constructed in such a manner that their own weight contributing to the total weight of the tracked vehicle is relatively low, as compared with running chains for heavy vehicles such as, for example, heavy construction machines. Moreover, as well as a length of the running gear of the tracked vehicle, a width of the caterpillar chain is usually designed such that a weight of the tracked vehicle as a whole is distributed to a comparatively large traction surface area, in order to limit pressure exerted upon the ground.

A known option for enlarging the contact surface area consists in combining a caterpillar chain from a traction chain and one or more lateral chains, the traction chain and the lateral chains being connected to each other by means of caterpillar cleats. The traction chain in this case is designed to transmit the propulsive force from a driving wheel to the caterpillar chain, for which reason the traction chain has a track, which is defined by track guide elements and which is on an inner side that faces toward the running gear, for guiding the running gear of the tracked vehicle. Owing to the comparatively low weight of, for example, snow vehicles, the traction chain for a piste vehicle may be made, for example, of an elastic, in particular elastomeric, base material. A traction means, in particular composed of a plurality of chain links in an endless configuration, can be embedded in the traction chain, e.g. in the elastomeric material of the basic chain, for transmitting acceleration and braking forces of a driving wheel to the running gear, in particular to the caterpillar chain. The traction means may be, for example, a woven fabric band composed of plastic fibers or, for example, a steel cable.

SUMMARY OF THE INVENTION

Because of adaptation to prescribed operating conditions and a given vehicle, known caterpillar chains, and, in particular, the traction chains, are limited in their application. The present invention is based on the object of providing a caterpillar chain, and, in particular, a traction chain that, comparatively, has a multiplicity of applications.

The present invention is based on a traction chain for a caterpillar chain of a tracked vehicle, in particular, a piste vehicle and/or a loipe grooming vehicle. The traction chain is provided with engagement means for a driving wheel, with track guide elements, which are provided to guide a running gear of the tracked vehicle in a track, on an inner side of the traction chain, running a running direction of the traction chain, with a multiplicity of attachment means, each of which is provided to attach a caterpillar cleat to an outer side of the traction chain and transversely in relation to the running direction of the traction chain, the traction chain being provided for use with a lateral chain running parallel therewith. The traction chain in this case is formed partially from an elastic, in particular elastomeric, base material, into which at least one traction means is embedded, running in a running direction of the traction chain.

The core of the present invention consists in that the traction means is embedded within a region of the elastic base material around which the base material has a thickness of at least 10 mm between the inner side and the outer side of the traction chain, the attachment means is embedded in the elastic base material of the traction chain, and each attachment means has a substantially continuous receiving profile, which runs transversely in relation to the running direction and which in cross section engages behind or is outwardly open in a U shape, and into each of which one of the caterpillar cleats can be inserted, in particular laterally, for the purpose of attaching, e.g. transversely in relation to the running direction of the traction chain, the caterpillar cleat being fixable to the attachment means in at least one inserted position. Owing to the attachment means, having the receiving profile that is designed for attaching the caterpillar cleats by lateral insertion, the traction chain offers an advantageously simple basic structure that, by receiving the caterpillar cleats in a form-fitting manner, offers comparatively favorable driving characteristics. Owing to the application means embedded in the base material of the traction chain, propulsive forces of a driving wheel can be transmitted in an advantageously uniform manner from a traction chain to a caterpillar cleat. A thickness of at least 10 mm between the inner and the outer side of the traction chain in this case advantageously offers the possibility of disposing the traction means in a region that is comparatively free of stress resulting from deformation, for example when the chain reverses direction. As a result, the traction chain can be of a more durable construction, making it possible to avoid wear resulting from flexural stresses and possibly separation of the elastic base material from the traction means embedded therein.

A preferred embodiment of the present invention consists in that the elastic base material is realized as a continuous band in the running direction. An embedded traction means, for example, a steel cable, can thus be completely surrounded by the elastic base material and advantageously protected, e.g. against moisture, over an entire length of a traction chain in the running direction, or along an entire revolution of a, for example, endless traction chain in the running direction.

The track guide elements may be embedded in the elastic base material. For rational production, the track guide elements are preferably formed on to the inner side of the traction chain, in the elastic base material. In both cases, advantageously, the elastic base material can effect elastic cushioning and damping of guide forces that act upon the traction chain from the running gear. The track guide elements in this case may be cast on, on the inner side of the traction chain, by means of a material that differs from the elastic base material.

Preferably, the attachment means comprises a rail element, having a U shape, which is embedded in the traction chain, and the material of which is harder than the elastic base material. The rail element in this case may be made, for example, of metal, or of a comparatively resistant plastic. The rail element may be embedded in the elastic base material, for example, by casting-in or, for example, by vulcanizing-in. This makes it easier, advantageously, to achieve a shape of the U-shaped, transversely in relation to the open receiving profile, that matches a cross section of the caterpillar cleat with an exact fit.

In particular, it is preferred that a plurality of inner surface portions of the receiving profile form a cross section by which attachment of one of the caterpillar cleats is possible only by lateral insertion of the caterpillar cleat. For example, a first and a second lateral limb of the U-shaped receiving profile may converge, or draw closer to each other, at least portionally, toward a U-profile opening, in order to fix a caterpillar cleat to the outside of the traction chain, in the running direction, with a constriction resulting therefrom.

The receiving profile may be extended, in a width of the traction chain, transversely in relation to the running direction, over a portion of the traction chain.

The receiving profile in this case, for the purpose of attaching a pin-shaped fixing element, can be realized parallel to the running direction, a caterpillar cleat inserted on the receiving profile being able to be fixed, by means of the fixing element, against being displaced transversely in relation to the running direction.

A preferred embodiment of the invention consists in that the receiving profile has a plurality of attachment positions for the pin-shaped fixing element. This offers the advantage that, depending on the particular application, a caterpillar cleat can be fixed in various positions, transversely in relation to the running direction.

Preferably, a chain web, having one of the receiving profiles, is realized on the traction chain, following each of the engagement means, in the running direction. A chain web can thus advantageously be reinforced, by means of the attachment means, in the region between two engagement means. The caterpillar cleats are preferably realized as tread elements, and possibly as ground engagement elements of the traction chain.

The engagement means on the traction chain may be realized, for example, as openings in the material, in order to avoid accumulation of ground material in the running gear.

Preferably, a plurality of traction means are embedded in the traction chain, in order to distribute tractive forces in a width of the traction chain. In particular, the traction means may be disposed next to a track portion of the traction chain, to enable the traction means to be disposed in a relatively straight manner in the running direction of the traction chain. This makes it possible to reduce, or even avoid, wear resulting from transverse forces within the chain.

A preferred embodiment of the present invention consists in that the attachment means each have a support portion, which is disposed between the traction means and the surface of the traction chain, on the inside thereof.

In this case, the support portion may be realized on the attachment means so as to project laterally over the receiving profile. Advantageously, the support portion makes it possible to avoid a situation in which the traction means and the attachment means can be deflected in opposite directions, such that damaging stresses occur in the elastic base material of the traction chain. In order to avoid concentrated action of forces upon the elastic base material, within the traction chain, on the support portion, outer edges are preferably rounded off, in particular the outer edges that are located on a side facing toward the traction means and that extend transversely in relation to the running direction.

Such damaging action of forces can be avoided even more effectively if a support portion is domed convexly on a side facing toward the traction means. The traction chain, in principle, may be a closed, continuous chain. To enable the traction chain to be used, if necessary, on a variety of vehicles, the traction chain is preferably composed of a plurality of traction chain segments connected to each other, along the running direction.

Proposed as a development of the traction chain according to the invention is a kit for constructing a caterpillar chain for a piste vehicle, the kit comprising a traction chain according to the invention, according to one or more of the aforementioned embodiments.

The kit preferably comprises a plurality of traction chain segments, which differ from each other in length in respect of the running direction. This makes it possible, for example, to combine a plurality of traction chain segments in such a manner that a traction chain composed thereof is suitable for a given vehicle, in particular its running gear.

Preferably, the kit comprises a plurality of lateral chain segments, which are of differing lengths in the running direction. This enables the lateral chain segments, likewise, to be adapted to corresponding dimensions of a vehicle. The lateral chain, in particular the lateral chain segments, can be realized for comparatively easy attachment, for example by screwed connection and, for example, by clamping to a caterpillar cleat. To enable the lateral chain to be guided concomitantly in a comparatively precise manner, U-shaped attachment means may be realized on the lateral chain, or on a lateral chain segment.

BRIEF DESCRIPTION OF THE DRAWINGS

The invention is explained in the following on the basis of exemplary embodiments and described with the aid of drawings, which are not true to scale. The drawings show:

FIGS. 13a and 13b are schematic perspective and side views of a web core and of a caterpillar cleat of a traction chain according to the present invention;

FIGS. 14a and 14b are schematic perspective and side views of a web core and of a caterpillar cleat of a traction chain according to the present invention;

DETAILED DESCRIPTION OF THE INVENTION

Figure 1:
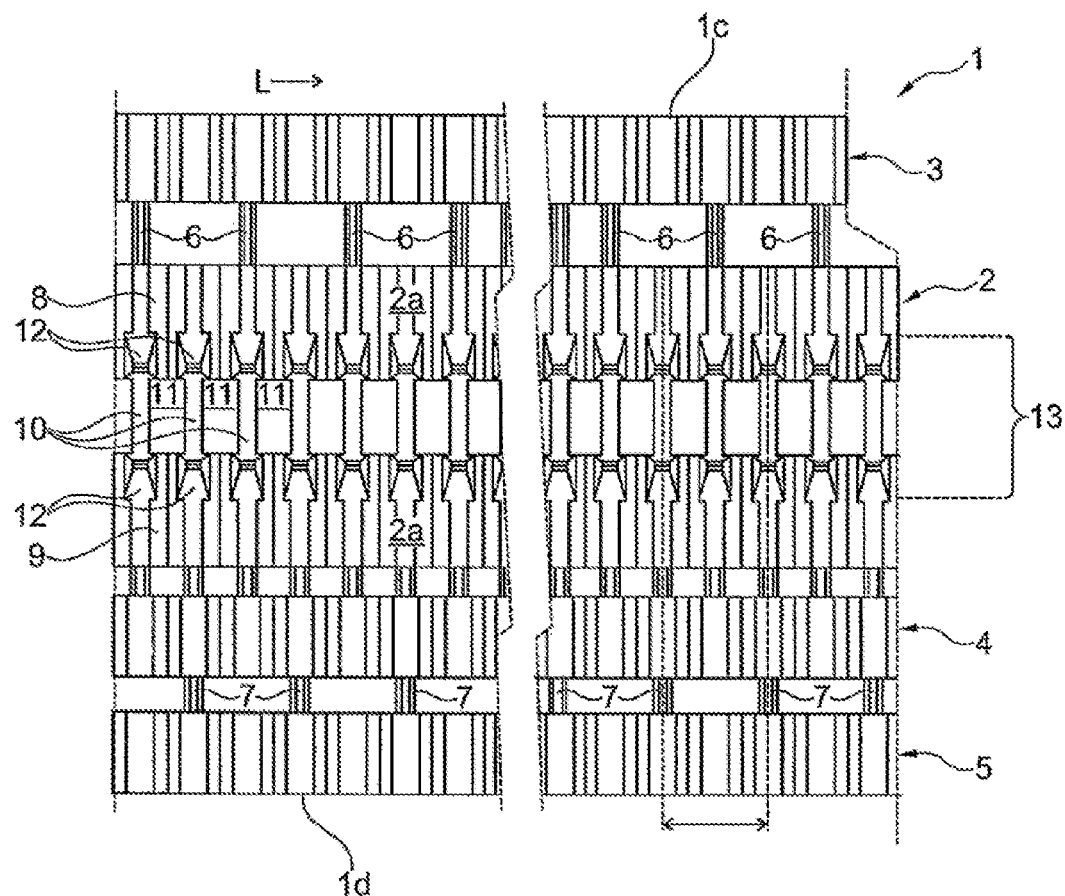
FIG. 1 is a schematic top view of an inner side of a caterpillar chain having a traction chain according to the invention.
Figure 2:
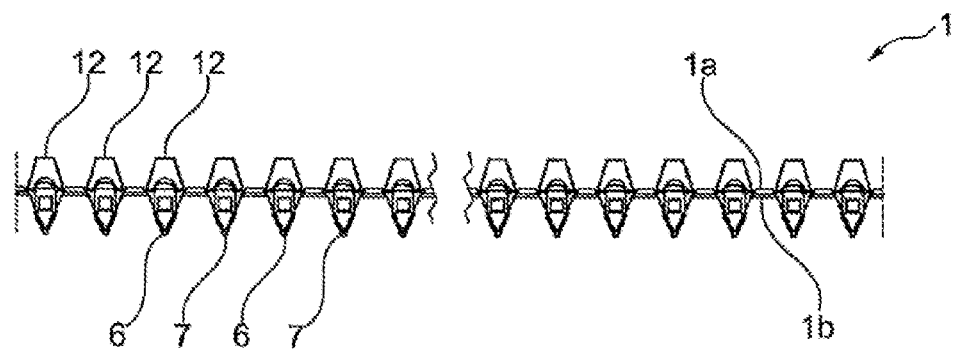
FIG. 2 is a schematic side view of the caterpillar chain.

FIGS. 1 and 2 show an exemplary embodiment of a segment of a caterpillar chain 1 for a snow or piste vehicle (not shown), having a traction chain 2 according to the invention. The traction chain 2 is connected to lateral chains 3 and 4 by a multiplicity of caterpillar cleats 6. A multiplicity of caterpillar cleats 7 connects the lateral chains 5 to the traction chain 2 and to the lateral chain 4. Each of the caterpillar cleats 6 in this case preferably extends continuously from the lateral chain 4 to, for example, an outside face 1c of the lateral chain 3. Likewise, each of the caterpillar cleats 7 may extend, for example, over an entire width, from the traction chain 2 to, for example, an outside face 1d. The caterpillar cleats 6 and 7 succeed one another, for example, in mutually alternating succession. In particular, the caterpillar cleats 6 and 7 in this case may be of equal length, and may be disposed with an offset in relation to each other in such a manner that the caterpillar cleats 6 project laterally on the traction chain 2, and the caterpillar cleats 7 project laterally on the lateral chain 4.

The lateral chains 3, 4 and 5 are disposed parallel to the traction chain 2. The traction chain 2 and the lateral chains 3, 4 and 5 are spaced apart from each other, in order to reduce or avoid accumulation of ground material such as, for example, snow, inside the caterpillar chain 1, which revolves during travel.

Figure 3:
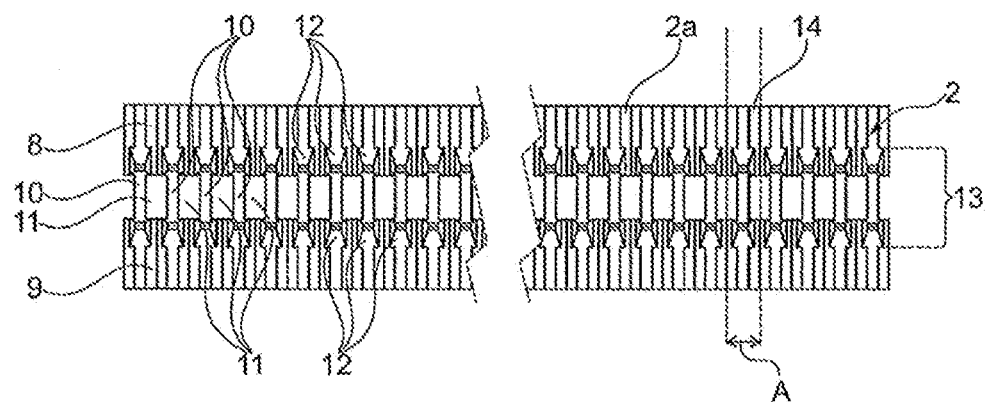
FIG. 3 is a schematic top view of a portion of a traction chain according to the invention.
Figure 4:
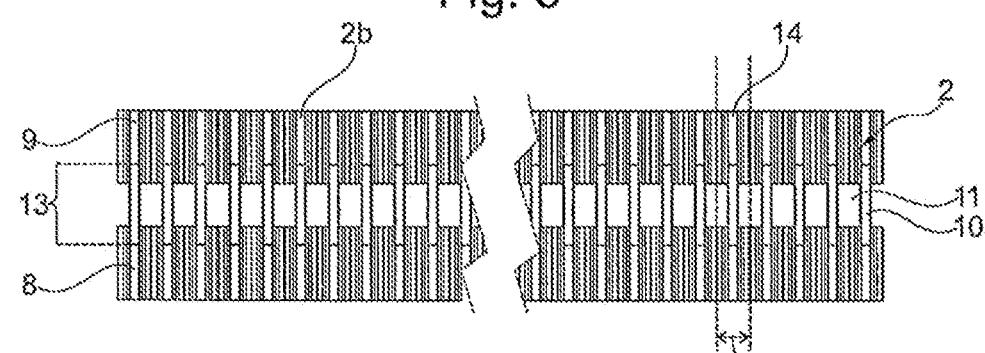
FIG. 4 is a schematic bottom view of the traction chain.
Figure 5:
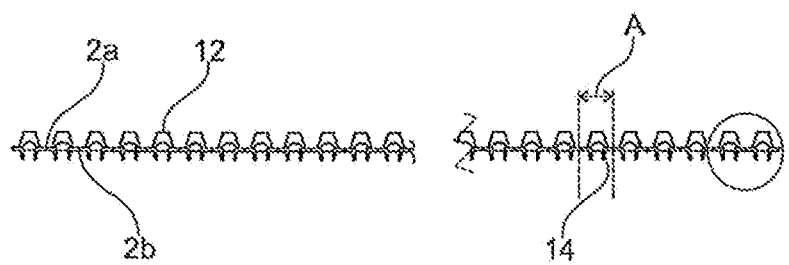
FIG. 5 is a schematic side view of the traction chain.

The traction chain 2 according to the present invention is shown separately, in differing views, in FIGS. 3, 4 and 5. The traction chain 2 has a multiplicity of chain webs 10, which extend transversely, in particular perpendicularly, in relation to a running direction L, and by means of which two chain belts 8 and 9 of the traction chain 2 are connected to each other at regular intervals A. Gaps 11 present between each two adjacent chain webs 10 are provided as engagement means for teeth (not shown) of, for example, a driving wheel (not shown).

The traction chain 2 is provided for direct contact and combined action, in progressive motion, with a running gear (not shown) of a piste vehicle (not shown), to which the caterpillar chain 1 is attached in a revolving manner. The running direction L is therefore defined by the traction chain 2. Preferably, the distance A is matched to a division of engaging teeth (not shown) of a driving wheel (not shown). The running gear (not shown) of the vehicle (not shown) in this case is in contact with an inner side 2a of the traction chain 2, an outer side of the traction chain 2 being in contact with ground, and the running gear being located on the inner side of the traction chain.

Hump-shaped protuberances 12 are realized on an inner side 2a of the traction chain 2, on the chain belts 8 and 9, to enable running gear parts (not shown) such as, for example, rollers, for example runners and, for example, a driving wheel of a tracked vehicle (not shown) to be guided in a track region 13 of the traction chain 2. The protuberances 12 may delimit the track region 13, for example, laterally, transversely in relation to the running direction L, in order to take up transverse forces, e.g. during cornering and, in particular, during travel on a slope inclined transversely in relation to the direction of travel.

Marked in FIGS. 3 to 5 is a segment 14 of the length A of the traction chain 2 that is shown with further details in FIGS. 6, 7, 8b and 9. The traction chain 2 is composed, in a periodic manner, of successive portions like the segment 14, and therefore the segment 14 may be regarded as a chain link of the traction chain 2.

The chain belts 8 and 9 are for the most part made of an elastic, in particular elastomeric, base material such as, for example, a rubber compound. In this case, if appropriate, the chain belts 8 and 9 may be produced together, for example in order for the chain belts 8 and 9 to be connected to each other by the base material in the region of the chain webs 10. Realized in the region of the chain belts 8 and 9, between the inner side 2a and an outer side 2b, there is a distance D, regions of which are completely filled by the base material of the traction chain 2. Furthermore, traction means are cast into each of the chain belts 8 and 9. The traction means may comprise, for example, a steel cable 16, and preferably a plurality of steel cables 16. This advantageously increases a load capacity of the chain belts 8, 9 in the running direction, in particular for the transmission of driving forces. In order to prevent the elastomeric base material of the chain belts 8, 9 from separating from the steel cables, the steel cables 16 are preferably completely enclosed by the base material and disposed in a central position, in particular in the region of a neutral fiber in respect of flexural stresses, between the inner side 2a and the outer side 2b of the traction chain 2.

In the region of the chain webs 10, a web core 15 is in each case embedded in the traction chain 2, in particular in the two chain belts 8 and 9, for example by casting-in or casting-on or, for example, by vulcanizing. Preferably in this case, an adhesive connection is realized between the base material and a core material of the web core 15. The surface of the web cores 15 may be, for example, roughened, in order to provide an enlarged adhesive surface if, for example, the web core 15 is cast into the base material.

Figure 6:
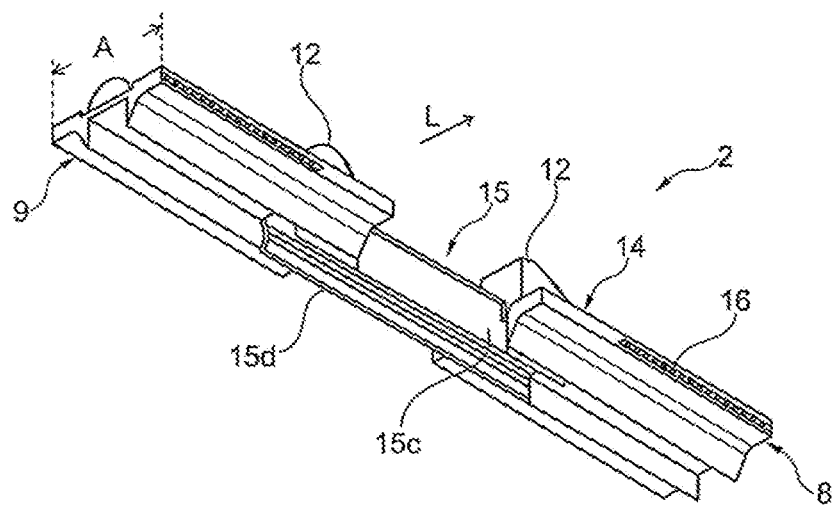
FIG. 6 is a schematic perspective view of a portion of the traction chain.
Figure 7:
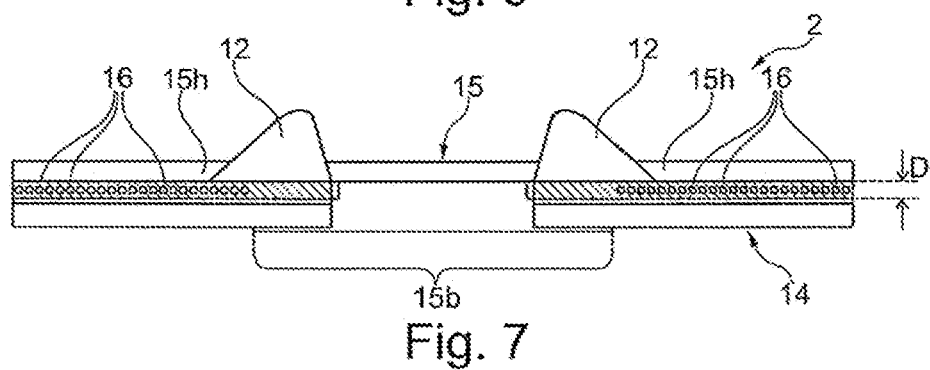
FIG. 7 is a schematic side view of the segment along a running direction of the traction chain.

The core material of the web cores 15 is preferably harder than the base material, and may be composed, for example, of a plastic, and in particular of a metal. Preferably, the web cores 15 are each produced as cast parts, continuously in one piece, from a light metal, in order to have a comparatively high strength with a low weight. The comparatively hard web core 15 enables tractive forces of a driving wheel (not shown) and weight forces of the, for example, piste vehicle (not shown) to be transmitted to the traction chain 2 and distributed to both chain belts 8 and 9. For this purpose, the web core 15 may have support portions 15h continued on both sides, in the longitudinal direction, from a central portion 15b (FIGS. 6, 7).

The web core 15 may be domed, for example in a semicircular shape, on an inner-side surface portion 15a, thereby enabling the web core 15 to be adapted to a shape of a gap (not shown) between two successive teeth (not shown) of a driving wheel (not shown), in order to provide the driving wheel with a precisely fitting hold on the traction chain 2. Preferably, the web core 15 is embedded in the base material of the traction chain 2, in particular in the chain belts 8 and 9, to such a depth that, on the inner side 2a—at least away from the gaps 11—only the domed surface portion 15a projects out of the base material.

Preferably, the web core 15 extends into the hump-shaped protuberances 12 of the chain belts 8 and 9, transversely in relation to the running direction (FIG. 7), and is preferably extended over an entire width of both chain belts 8 and 9 that lies transversely in relation to the running direction, and over the gap 11.

Realized on the central portion 15b, parallel to a longitudinal axis of the web core 15, are two wall-type limb portions 15c and 15d, which project from the web portion 15 between the chain belts 8, 9 and partially within the chain belts 8, 9, on the outer side 2b of the traction chain 2.

Figure 8B:
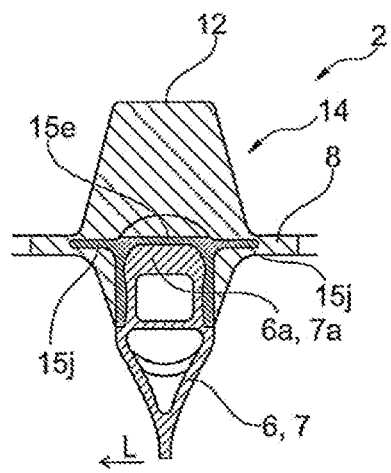
FIG. 8b is a schematic side view of a section through the segment of the traction chain.
Figure 9:
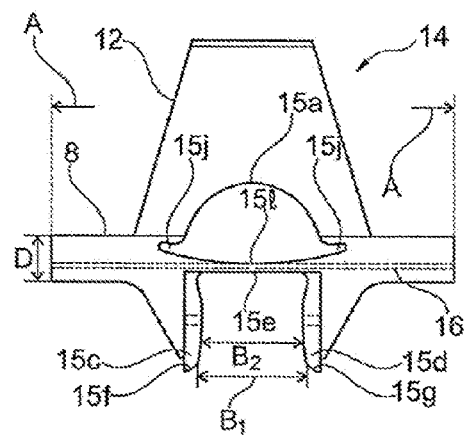
FIG. 9 is a schematic side view of segment of the traction chain.
Figure 10:
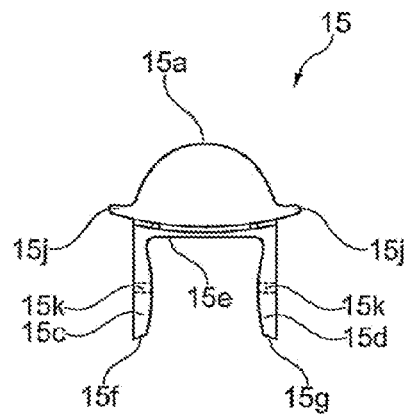
FIG. 10 is a schematic side view of a web core of the traction chain.
Figure 11:
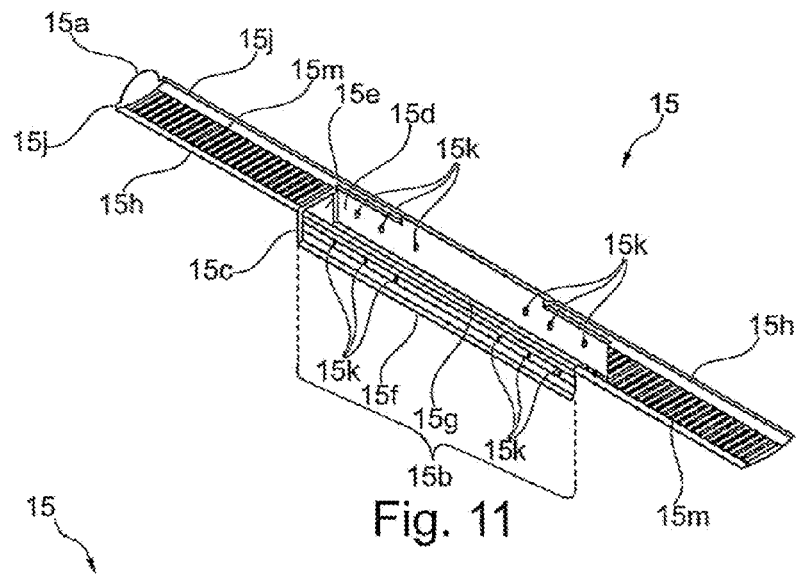
FIG. 11 is a schematic perspective view of the web core of the traction chain.
Figure 12:
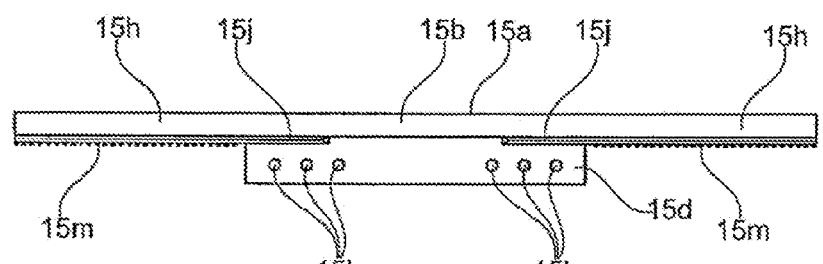
FIG. 12 is a schematic side view of the web core in a running direction of the traction chain.

As shown by FIG. 9, the limb portions 15c and 15d are disposed, for example, parallel to each other, at a distance of a width $B_1$ of the web core 15. The web core 15 that can be seen in FIG. 9 is shown as a single part in FIGS. 10, 11 and 12. The limb portions 15c and 15d are preferably formed on to the rest of the web core 15 in a continuous manner and, with a bridge portion 15e of the web core 15, form a U-shaped profile, which extends transversely in relation to the running direction of the traction chain 2 and in which a respective profile rail 6a, 7a of one of the caterpillar cleats 6 and 7, respectively, can be inserted laterally (FIG. 8b). By means of the bridge portion 15e, a portion of a perpendicularly acting weight force, for example, can be transmitted to a caterpillar cleat 6 or 7, the force advantageously being able to be transmitted in a distributed manner, over a width $B_1$, to the bridge portion 15e. In a corresponding manner, by means of the limb portions 15c and 15d, driving forces acting in the running direction of the traction chain 2 can be transmitted to a caterpillar cleat 6 and 7, respectively.

Between the bridge portion 15e and an end edge 15f and 15g, respectively, the limb portions 15c and 15d project into a free space, in which the limb portions 15c and 15c are at a distance $B_2$ from each other. The distance $B_2$ is less than the distance $B_1$ in the region of the bridge portion 15e, such that a constriction is realized between the bridge portion 15e and the opening between the end edges 15f and 15g. Preferably, the constriction is matched to a rail profile portion 6a of the caterpillar cleats 6 or 7, respectively, in such a manner that a caterpillar cleat 6 or 7, respectively, is held in place by mutual form-fitting engagement on the web core 15, in directions perpendicular to the longitudinal direction of the web core 15. The web core 15 is thus realized to engage behind the caterpillar cleat 6 or 7, respectively. This makes it possible, in particular, to avoid the use of attachment means going through the web core perpendicularly in relation to a plane that lies in the chain belts 8 and 9, respectively. The web core 15 therefore has a relatively high strength.

For the purpose of fixing parallel to the longitudinal direction of the web core 15, and in particular to the longitudinal direction of the rail profile formed by the portions 15c, 15d and 15e, the limb portions 15c and 15d may have, for example, drilled holes 15k (FIGS. 10, 11, 12), at which a caterpillar cleat 6 or 7 can be locked on the web core 15 in respect of an insertion direction, for example by means of a screw (not shown) or a pin-shaped insertable locking element (not shown).

The domed surface portion 15a may be extended over the central portion 15b and both support portions 15h. The web core 15 in this case may be realized as a rod that is partially embedded in the chain belts 8 and 9 and that distributes, for example, weight forces to both chain belts 8, 9 over, in particular, the entire width thereof. The traction means, in particular the steel cables 16, are preferably disposed between the web cores 15 and the outer side 2b of the traction chain 2.

Surface portions 15l opposite the surface portion 15a may likewise have a convex dome on the support portions 15h, with the result that, at outer edges of the support portions, there is comparatively more elastic base material disposed between, for example, the steel cables 16 and the support portions 15h than in a central region beneath the support portions 15h. This makes it possible to avoid kinking or breakage on one of the steel cables 16 as a result of concentrated application of force. In order to counteract, in addition, concentrated applications of force upon the chain belts 8, 9 from the web core 15, projections 15j may be realized on the support portions 15h and also on the central portion 15b—e.g. away from the gaps 11—by which a force-transmitting surface is enlarged, in particular on an underside of the support portions 15h. Furthermore, groove structures 15m, extending in the running direction of the traction chain 2, are realized on undersides of the support portions 15h. The groove structures make it possible to reduce torsional and shear forces, which, when transverse forces occur, can be transmitted from the web core 15 to, for example, a steel cable 16 embedded as a traction means.

Figure 8A:
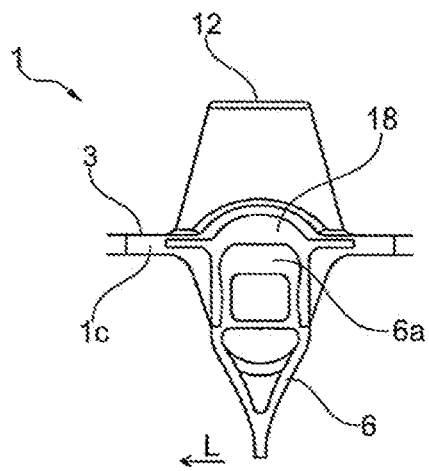
FIG. 8a is a schematic side view of the segment of the caterpillar chain.

On the end face 1c of the caterpillar cleat 1, in particular the lateral chain 3, shown in FIG. 8a, it can be seen that a receiving core 18 may be realized, for example in the lateral chain 3, into which a caterpillar cleat 6 may be inserted laterally for the purpose of attaching. In a manner similar to a web core 15 on the chain belts 8, 9, the receiving core 18 may be embedded in a base material of the lateral chain 3, and in particular cast therein.

Figure 15A:
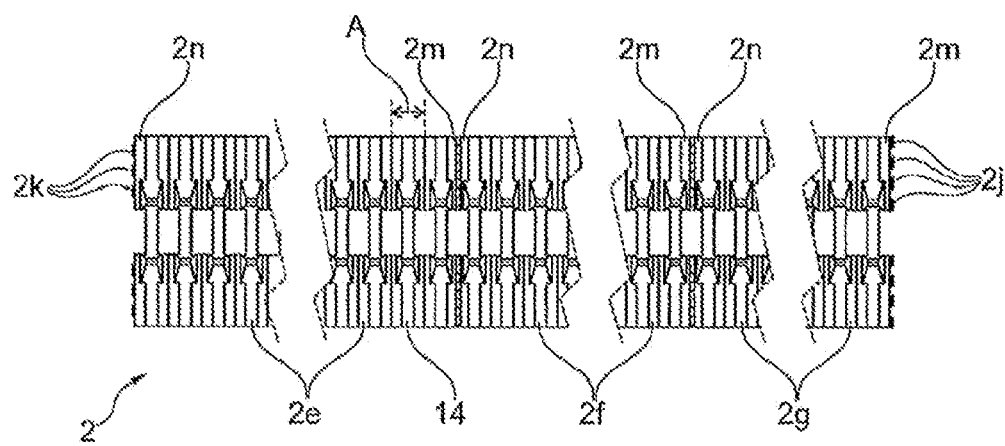
FIGS. 15a and 15b are schematic top and side views of a traction chain according to the present invention.
Figure 15B:
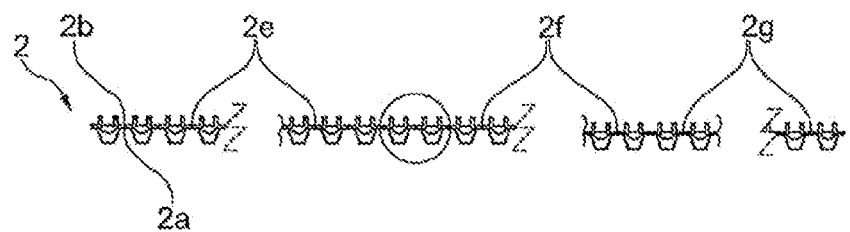
Figure 16:
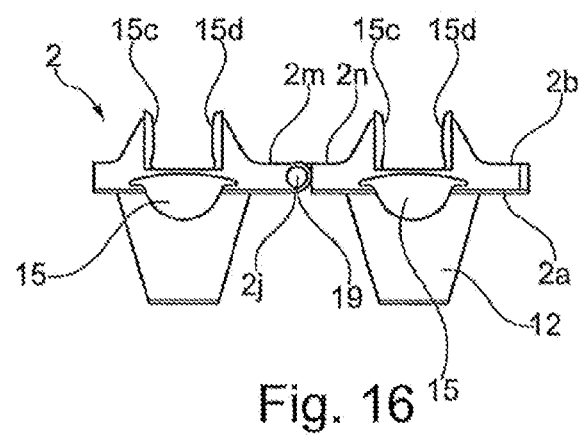
FIG. 16 shows a segment from the schematic side view in FIG. 15b.

For an insertable, engaging attachment, cross-section profiles may be realized in a variety of shapes and matched to each other on a web core 15 and on a caterpillar cleat 6. Shown in FIG. 13a, as a further exemplary embodiment, is a web core 15 for a traction chain 2 according to the invention, realized on the central portion 15b of which there is a rail-shaped profile portion 15n having a trapezoidal cross section, the cross section of the inner space being open toward the outer side 2b, on a short parallel side. As shown in FIG. 13b, the caterpillar cleat 6 is provided with a rail-shaped hollow profile 6b, which has an upwardly open, tapering cross section. The web core 15 and the caterpillar cleat 6 in this case are matched to each other in such a manner that the hollow profile 6b of the caterpillar cleat 6, when in an inserted position, can engage around and behind the profile portion 15n, preferably without play. In this case, the trapezoidal cross section of the mutually engaging profiles of the web core 15 and caterpillar cleat 6 does not allow any rotation about a longitudinal axis of the web core. Small rotational or swiveling movements of a caterpillar cleat 6 are possible, for example, with an embodiment according to FIG. 14a, in which a web core 15 has a rail-shaped profile portion 15p having a cross section in the shape of a circular ring. For the purpose of attaching in a form-fitting manner by insertion, a caterpillar cleat 6 is matched to the profile portion 15p by means of a hollow profile 6c, in the shape of a circular ring, that is open on one side (see FIG. 14b). In order to realize a traction chain 2 according to the invention such that it can be adapted to differing running-gear dimensions, the traction chain 2 may be composed of a plurality of chain segments 2e, 2f and 2g that, in particular, differ in length in the running direction (FIGS. 15a and 15b). The chain segments 2e-2g may differ from each other in their length by, for example, a number of chain links 14. There is a very great variety of means, known from the prior art, for connecting two chain segments. FIG. 16 is an enlarged view of the circled area in FIG. 15b.

For example, for the purpose of connecting two of the chain segments 2e, 2f, 2g, to each of the chain segments, a multiplicity of connecting projections 2j may be realized, at a first segment end 2m, which are matched, in respect of their width and their distances in relation to each other, to a multiplicity of connecting projections 2k located at an opposite end 2n of the chain segment. The connecting projections 2j and 2k are drilled-through transversely in relation to the running direction. This allows a connecting pin 19 to extend through all connecting projections 2j and 2k when, for example, the connecting projections 2j of the chain segment 2e are disposed so as to engage between the connecting projections 2k of the chain segment 2f.

LIST OF REFERENCES 1 caterpillar chain
1a inner side
1b outer side
1c end face
1d end face
2 traction chain
2a inner side
2b outer side
2e chain segment
2f chain segment
2g chain segment
2j connecting projection
2k connecting projection
2m segment end
2n segment end
3 lateral chain
4 lateral chain
5 lateral chain
6 caterpillar cleat
6a profile rail
6b hollow profile
6c hollow profile
7 caterpillar cleat
8 chain belt
9 chain belt
10 chain web
11 gap
12 protuberance
13 track region
14 segment
15 web core
15a surface portion
15b central portion
15c limb portion
15d limb portion
15e bridge portion
15f end edge
15g end edge
15h support portion
15j projection
15k drilled hole
15m structuring
15n profile portion
15p profile portion
16 steel cable
18 receiving core
19 connecting pin

The invention claimed is:

1. A traction chain for a caterpillar chain of a tracked vehicle, comprising an engagement member for a driving wheel of the tracked vehicle, track guide elements that are provided to guide the traction chain on the driving wheel of the tracked vehicle in a track portion on an inner side of the traction chain and in a running direction of the traction chain, and a plurality of attachment members, with each attachment member provided to attach a caterpillar cleat to an outer side of the traction chain in direction transverse relative to the running direction of the traction chain, wherein the traction chain is provided for use with a lateral chain running parallel therewith, the traction chain is formed partially from an elastic, base material, and having at least one traction member embedded in the elastic base material and extending in the running direction of the traction chain, the traction member is embedded within a region of the elastic base material, with the elastic base material having a thickness of at least ten millimeters between the inner side and the outer side of the traction chain, the attachment members are embedded in the elastic base material of the traction chain such that each attachment member has at least one of an outwardly open U shape receiving profile and a receiving profile that engages behind a profile rail of one of the caterpillar cleats, which extends in the direction transverse relative to the running direction and into which one of the caterpillar cleats is inserted laterally, for the purpose of attaching the caterpillar cleat in the direction transverse relative to the running direction of the traction chain, with the caterpillar cleat fixed to the attachment members in at least one inserted position.

2. The traction chain according to claim 1, wherein the elastic base material is a continuous band in the running direction.

3. The traction chain according to claim 1, wherein the track guide elements are embedded in the elastic base material.

4. The traction chain according to claim 1, wherein the track guide elements are formed on the inner side of the traction chain, in the elastic base material.

5. The traction chain according to claim 1, wherein the track guide elements are cast on the inner side of the traction chain, by a material that differs from the elastic base material.

6. The traction chain according to claim 1, wherein the attachment members comprise a rail element, which is embedded in the traction chain, and the material of which is harder than the elastic base material.

7. The traction chain according to claim 1, wherein a plurality of inner surface portions of the attachment members form a cross section by which attachment of one of the caterpillar cleats is possible only by lateral insertion of the caterpillar cleat.

8. The traction chain according to claim 1, wherein the attachment members extend, in a width of the traction chain, transversely in relation to the running direction, over a portion of the traction chain.

9. The traction chain according to claim 1, wherein the caterpillar cleat is fixed to the attachment members by a pin-shaped fixing element that is arranged parallel to the running direction such that an inserted caterpillar cleat is fixed against being displaced transversely in relation to the running direction.

10. The traction chain according to claim 9, wherein the attachment members have a plurality of attachment positions for the pin-shaped fixing element.

11. The traction chain according to claim 1, wherein a chain web, having one of the attachment members, is provided on the traction chain, following each of the engagement members, in the running direction.

12. The traction chain according to claim 1, wherein the caterpillar cleats are ground engagement elements of the traction chain.

13. The traction chain according to claim 1, wherein the engagement members on the traction chain are formed as openings in the material.

14. The traction chain according to claim 1, wherein a plurality of traction members are embedded in the traction chain.

15. The traction chain according to claim 14, wherein the traction members are disposed next to the track portion of the traction chain.

16. The traction chain according to claim 1, wherein the attachment members each have a support portion, which is disposed between the traction member and the surface of the traction chain, on the inside thereof.

17. The traction chain according to claim 1, wherein a support portion is provided on the attachment members so as to project laterally and is embedded in the elastic base material, between the inner side of the traction chain and the traction member.

18. The traction chain according to claim 17, wherein on the support portion, outer edges that are located on a side facing toward the traction member and that extend transversely in relation to the running direction are rounded off.

19. The traction chain according to claim 17, wherein the support portion is domed convexly on a side facing toward the traction member.

20. The traction chain according to claim 1, wherein the traction chain is composed of a plurality of traction chain segments connected to each other, along the running direction.

21. A kit for constructing a caterpillar chain for a piste vehicle, comprising a traction chain according to claim 1.

22. The kit according to claim 21, wherein the kit comprises a plurality of traction chain segments, which differ from each other in length in respect of the running direction.

23. The kit according to claim 21, wherein the kit comprises various lateral chain segments whose differing lengths in the running direction are matched to differing lengths of traction chain segments in the running direction.

24. The kit according to claim 21, wherein the kit comprises the lateral chain, which is provided to be moved concomitantly and parallel with the traction chain, the lateral chain having at least one U-shaped receiving profile, into which a caterpillar cleat can be inserted, transversely in relation to the running direction of the lateral chain.

25. The kit according to claim 21, wherein each part of the kit is provided such that a respective caterpillar chain for a left side and a right side of the piste vehicle can be constructed.

* * * * *